United States Patent
Moskowitz

(10) Patent No.: US 7,127,615 B2
(45) Date of Patent: Oct. 24, 2006

(54) SECURITY BASED ON SUBLIMINAL AND SUPRALIMINAL CHANNELS FOR DATA OBJECTS

(75) Inventor: Scott A. Moskowitz, Miami, FL (US)

(73) Assignee: Blue Spike, Inc., Sunny Isles Beach, FL (US)

( * ) Notice: Subject to any disclaimer, the term of this patent is extended or adjusted under 35 U.S.C. 154(b) by 938 days.

(21) Appl. No.: 09/956,262

(22) Filed: Sep. 20, 2001

(65) Prior Publication Data

US 2002/0056041 A1    May 9, 2002

Related U.S. Application Data

(60) Provisional application No. 60/234,199, filed on Sep. 20, 2000.

(51) Int. Cl.
H04L 9/00 (2006.01)
(52) U.S. Cl. .......................... 713/176; 726/26; 726/32; 726/33
(58) Field of Classification Search ................ 713/176; 726/26, 32, 33
See application file for complete search history.

(56) References Cited

U.S. PATENT DOCUMENTS 5,428,606 A    6/1995  Moskowitz (Continued)

OTHER PUBLICATIONS

U.S. Appl. No. 08/999,766, filed Jul. 23, 1997, entitled "Steganographic Method and Device".

(Continued)

Primary Examiner—Jacques Louis-Jacques
Assistant Examiner—Jacob Lipman

(57) ABSTRACT

This invention relates to security for data objects; more particularly, the present invention relates to improved security based on subliminal and supraliminal channels for data objects.

In one embodiment, a method for protecting a data signal comprises: providing a data signal to be encoded; using a first predetermined key to encode a first set of independent data into the data signal imperceptibly; and using a second predetermined key to encode a second set of independent data into the data signal perceptibly.

In another embodiment, a method of protecting a data object comprises: steganographically encoding a subset of candidate bits in a digitized sample stream; perceptibly manipulating data in the digitized sample stream; and combining the imperceptible and perceptible data changes to create a secure/unique digital sample stream.

In yet another embodiment, a method for securing a data signal comprises: preanalyzing said data signal for candidate watermark/signature bits; steganographically encoding independent data into the data signal into a subset of the candidate watermark bits, at least one time; and encoding the data signal subsequently with a perceptible technique.

In yet another embodiment, a method of protecting a data signal comprises: imperceptibly embedding data using a watermarking technique; perceptibly signing the data using the receiver's public key; encrypting the data signal using the receiver's public key and the private key used to watermark the signal; and enabling a receiver to authenticate/verify (separate steps) the data signal while connected to a communications channel.

15 Claims, 4 Drawing Sheets

U.S. PATENT DOCUMENTS

| | | | |
|---|---|---|---|
| 5,539,735 | A | 7/1996 | Moskowitz |
| 5,613,004 | A * | 3/1997 | Cooperman et al. .......... 380/28 |
| 5,687,236 | A | 11/1997 | Moskowitz et al. |
| 5,745,569 | A | 4/1998 | Moskowitz et al. |
| 5,822,432 | A | 10/1998 | Moskowitz et al. |
| 5,889,868 | A | 3/1999 | Moskowitz et al. |
| 5,905,800 | A | 5/1999 | Moskowitz et al. |
| 6,078,664 | A | 6/2000 | Moskowitz et al. |
| 6,131,162 | A * | 10/2000 | Yoshiura et al. ............ 713/176 |
| 6,205,249 | B1 | 3/2001 | Moskowitz |
| 6,425,081 | B1 * | 7/2002 | Iwamura ..................... 713/176 |
| 6,522,767 | B1 | 2/2003 | Moskowitz et al. |
| 6,530,021 | B1 * | 3/2003 | Epstein et al. .............. 713/176 |
| 6,598,162 | B1 | 7/2003 | Moskowitz |
| 6,754,822 | B1 * | 6/2004 | Zhao ......................... 713/176 |
| 6,853,726 | B1 | 2/2005 | Moskowitz et al. |

OTHER PUBLICATIONS

EPO Application No. 96919405.9, entitled "Steganographic Method and Device".

U.S. Appl. No. 08/674,726, filed Jul. 2, 1996, entitled "Exchange Mechanisms for Digital Information Packages with Bandwidth Securitization, Multichannel Digital Watermarks, and Key Management".

U.S. Appl. No. 09/545,589, filed Apr. 7, 2000, entitled "Method and System for Digital Watermarking".

U.S. Appl. No. 09/046,627, filed Mar. 24, 1998, entitled "Method for Combining Transfer Function with Predetermined Key Creation" now U.S. Patent No. 6,598,162, Jul. 22, 2003.

U.S. Appl. No. 09/053,628, filed Apr. 2, 1998, entitled "Multiple Transform Utilization and Application for Secure Digital Watermarking".

U.S. Appl. No. 09/644,098, filed Aug. 23, 2000, entitled "Multiple Transform Utilization and Application for Secure Digital Watermarking".

Jap. App. No. 2000-542907, entitled "Multiple Transform Utilization and Application for Secure Digital Watermarking".

U.S. Appl. No. 09/767,733, filed Jan. 24, 2001, entitled "Multiple Transform Utilization and Application for Secure Digital Watermarking".

U.S. Appl. No. 10/417,231, filed Apr. 17, 2003, entitled "Methods, Systems And Devices For Packet Watermarking And Efficient Provisioning Of Bandwidth".

U.S. Appl. No. 10/602,777, filed Jun. 25, 2003, entitled "Method for Combining Transfer Function with Predetermined Key Creation".

U.S. Appl. No. 10/369,344, filed Feb. 18, 2003, entitled "Optimization Methods for the Insertion, Protection, and Detection of Digital Watermarks in Digital Data".

U.S. Appl. No. 09/789,711, filed Feb. 22, 2001, entitled "Optimization Methods for the Insertion, Protection, and Detection of Digital Watermarks in Digital Data".

U.S. Appl. No. 09/594,719, filed Jun. 16, 2000, entitled "Utilizing Data Reduction in Steganographic and Cryptographic Systems".

U.S. Appl. No. 09/731,040, filed Dec. 7, 2000, entitled "Systems, Methods And Devices For Trusted Transactions".

U.S. Appl. No. 10/049,101, filed Feb. 8, 2002, entitled "A Secure Personal Content Server" (which claims priority to International Application No. PCT/US00/21189, filed Aug. 4, 2000, which claims priority to U.S. Appl. No. 60/147,134, filed Aug. 4, 1999, and to U.S. Appl. No. 60/213,489, filed Jun. 23, 2000).

PCT Application No. PCT/US00/21189, filed Aug. 4, 2000, entitled, "A Secure Personal Content Server".

U.S. Appl. No. 09/657,181, filed Sep. 7, 2000, entitled "Method And Device For Monitoring And Analyzing Signals".

U.S. Appl. No. 10/805,484, filed Mar. 22, 2004, entitled "Method And Device For Monitoring And Analyzing Signals"(which claims priority to U.S. Appl. No. 09/671,739, filed Sep. 29, 2000, which is a CIP of U.S. Appl. No. 09/657,181).

U.S. Appl. No. 09/956,262, filed Sep. 20, 2001, entitled "Improved Security Based on Subliminal and Supraliminal Channels For Data Objects".

U.S. Appl. No. 11,026,234, filed Dec. 30, 2004, entitled "Z-Transform Implementation of Digital Watermarks".

* cited by examiner

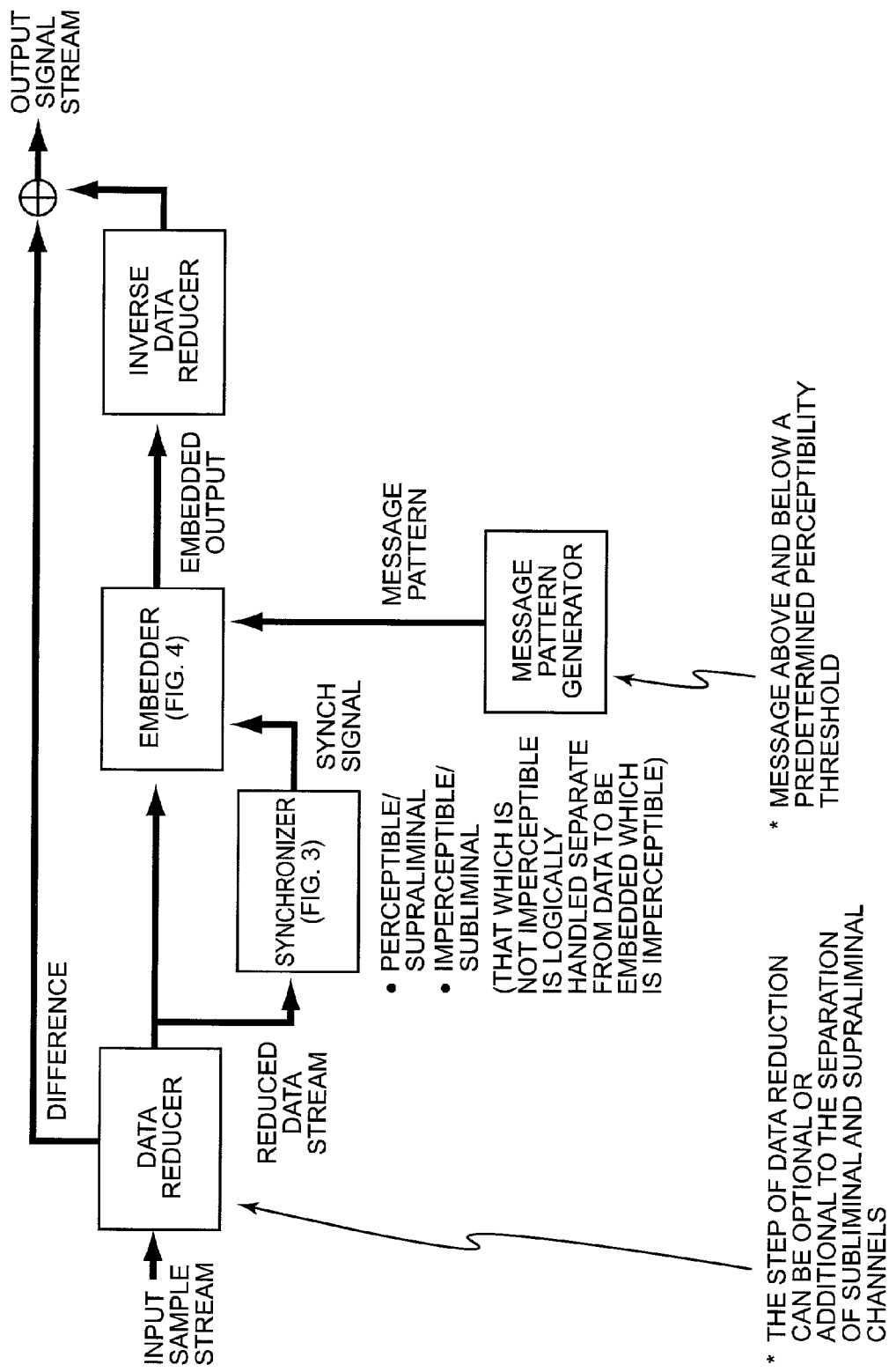
FIG. 1 EMBEDDING SYSTEM

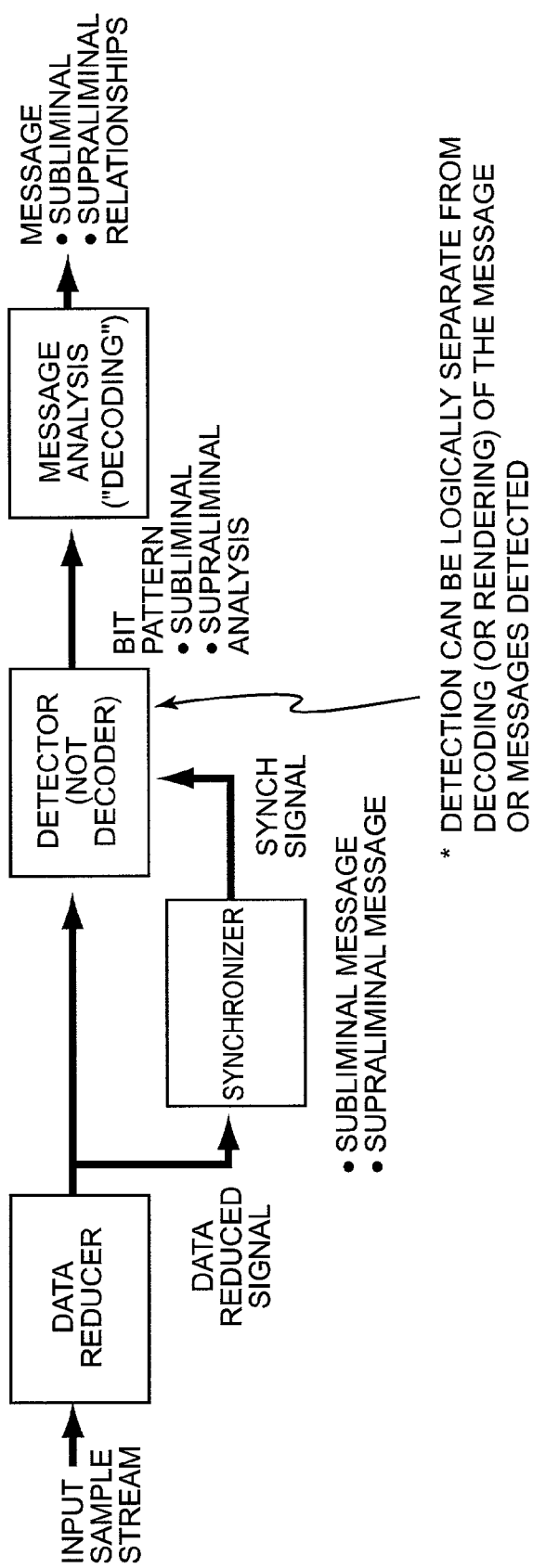
FIG. 2 DETECTOR SYSTEM
(INDEPENDENT FROM THE EMBEDDING SYSTEM OF FIG. 1)

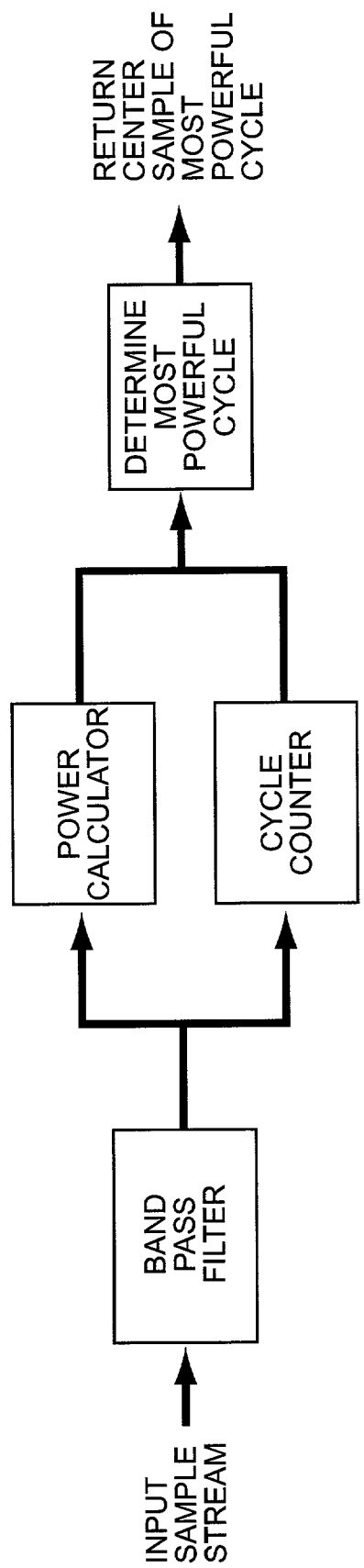
FIG. 3 SYNCHRONIZER

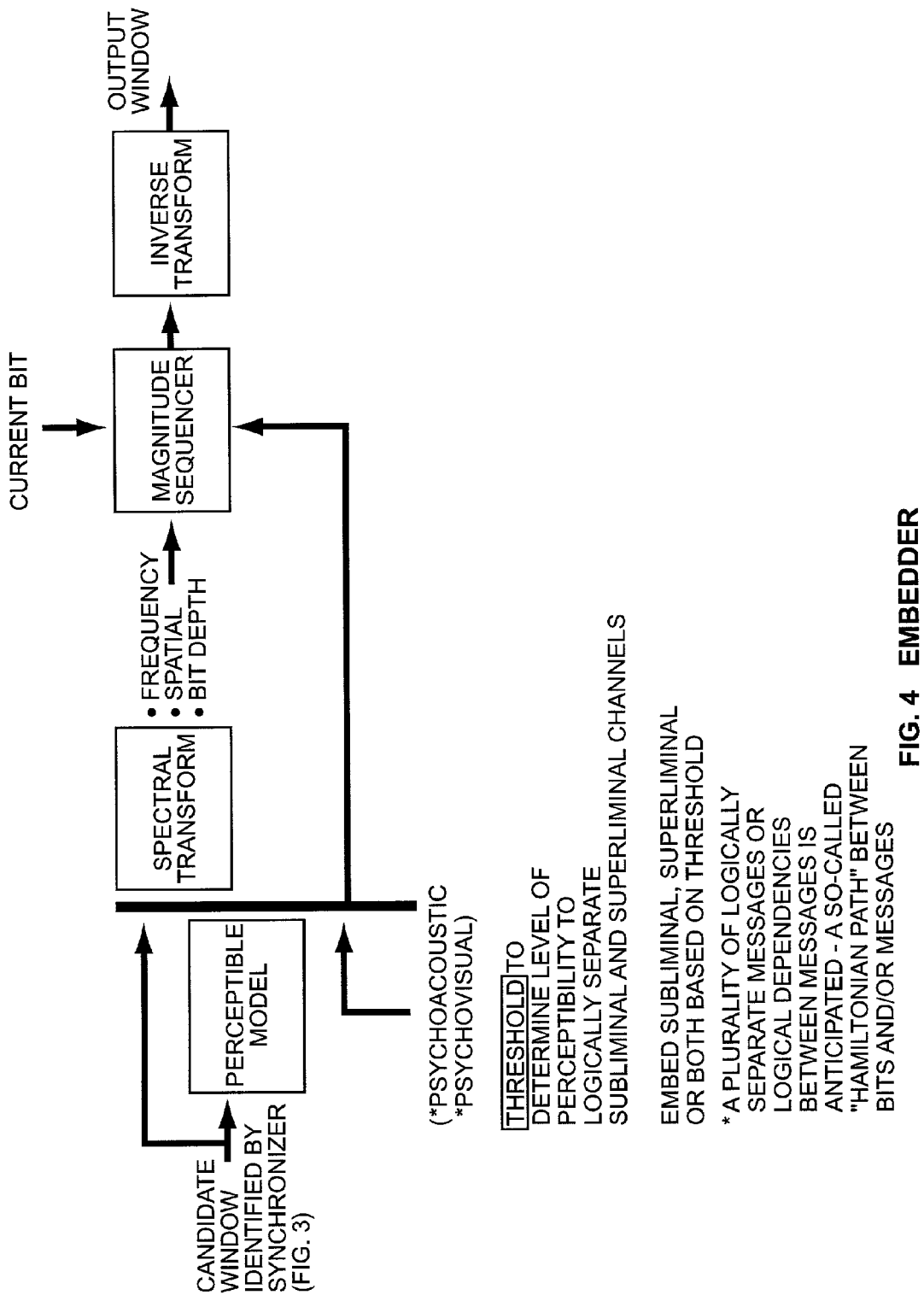
FIG. 4 EMBEDDER

SECURITY BASED ON SUBLIMINAL AND SUPRALIMINAL CHANNELS FOR DATA OBJECTS

CROSS REFERENCE TO RELATED APPLICATION

This application claims the benefit of U.S. provisional patent application Ser. No. 60/234,199, entitled "Improved Security Based on Subliminal and Supraliminal Channels for Data Objects," filed Sep. 20, 2000, the entire disclosure of which is hereby incorporated by reference.

BACKGROUND OF THE INVENTION

1. Field of the Invention

This invention relates to security for data objects; more particularly, the present invention relates to improved security based on subliminal and supraliminal channels for data objects.

2. Description of Related Art

Digital watermarking enables a number of security features in handling various data. Application of a cryptographic protocol to the limits of steganographic measures of perceptibility (i.e., embedding a digital watermark just shy of the point where the watermark becomes humanly perceptible) yields both robust and secure techniques. Digital watermarking serves to tamperproof data by maximizing the encoding level of the subliminally embedded data, a form of information hiding, while preserving the fidelity of the cover channel (as represented by a digitally sampled signal stream). When attempts to remove or erase a digital watermark should result in perceptible changes to the cover signal, such watermarking serves as a simple form of perceptible authentication. Moreover, such watermarking preserves the signal's commercial integrity because to remove the watermark necessarily degrades the signal quality, resulting in a lower commercial value of the data, assuming that the quality of the signal plays some role in determinations of that value. Authentication and verification of the watermarked signal are functions of the predetermined quality of the cover signal as intended by the sender of the watermarked data.

SUMMARY OF THE INVENTION

Therefore, a need has arisen for improved security based on subliminal and supraliminal channels for data objects.

In one embodiment, a method for protecting a data signal is disclosed, which method comprises: providing a data signal to be encoded; using a first predetermined key to encode a first set of independent data into the data signal imperceptibly; and using a second predetermined key to encode a second set of independent data into the data signal perceptibly. Optionally, the first and second sets of independent data may be passed through hash functions, and their hash values may be associated with one or the other of the first and second predetermined keys.

In another embodiment, a method of protecting a data object is also disclosed, which method comprises: steganographically encoding a subset of candidate bits in a digitized sample stream; perceptibly manipulating data in the digitized sample stream; and combining the imperceptible and perceptible data changes to create a secure/unique digital sample stream. The steganographic encoding may be handled by one or more of a plurality of cryptographically-generated keys. The steganographic encoding may also be handled by cryptographically-generated key pairs.

In yet another embodiment, a method for securing a data signal is also disclosed, which method comprises: preanalyzing said data signal for candidate watermark/signature bits; steganographically encoding independent data into the data signal into a subset of the candidate watermark bits, at least one time; and encoding the data signal subsequently with a perceptible technique. Preanalysis may include measuring the data signal for at least one of entropy, noise, and a subliminal channel.

In yet another embodiment, a method of protecting a data signal is disclosed, which method comprises: imperceptibly embedding data using a watermarking technique; perceptibly signing the data using the receiver's public key; encrypting the data signal using the receiver's public key and the private key used to watermark the signal; and enabling a receiver to authenticate/verify (separate steps) the data signal while connected to a communications channel.

In yet another embodiment, a method for securing a data signal is disclosed, which method comprises: preanalyzing said data signal for candidate watermark/signature bits; steganographically encoding independent data into the data signal into a subset of the candidate watermark bits, at least one time; and subsequently steganographically encoding the remainder bits. The method may also include the steps of: generating a pattern of 1s and 0s; and embedding the pattern of 1s and 0s into the data signal. The method may also include the additional step of decoding the pattern of 1s and 0s as a means of authenticating the data signal. The method may also use a third predetermined key to perceptibly encode a third set independent data, which independent data is provided to permit authentication by a user. The third set of independent data may also be decoded to authenticate the accuracy of the content of the third set of independent data. A fourth predetermined key may be used to imperceptibly encode a fourth set independent data, which independent data may be intended for access only by a predetermined user. For example, the fourth set of independent data may be encoded using a public key of a user such that only the intended user may decoding the fourth set of independent data, using his private key (wherein the private key and the public key corresponding to a public/private key-pair for the user).

In yet another embodiment, a method for protecting a data signal is also disclosed, which method comprises: using a predetermined key to imperceptibly encode a data stream with a first set of independent data; providing a housing to house said data stream; and placing on the housing a perceptible machine-readable unique identifier. The perceptible machine-readable unique identifier may contain information about the first set of independent data, or may contain information about how the predetermined key was used to embed the first set of independent data. The housing may be a compact disc, a holder for a compact disc, or a housing to hold a magnetic storage medium.

In yet another embodiment, a method for protecting a data signal is disclosed, which method comprises: providing a data signal to be encoded; using a predetermined key to encode a first set of independent data into the data signal imperceptibly and to encode a second set of independent data into the data signal perceptibly. Optionally, the first and second sets of independent data may be passed through hash functions, and their hash values may be associated with the predetermined key. The predetermined key may be based upon the Hamiltonian path, in whole or in part, that exists between the bits that are imperceptible and bits that are perceptible.

BRIEF DESCRIPTION OF THE DRAWINGS

For a more complete understanding of the invention and some advantages thereof, reference is now made to the following descriptions taken in connection with the accompanying drawings in which:

FIGS. 1, 3 and 4 relate to one embodiment of the present invention. FIG. 2 is a detector system which may be used in connection with the embodiment of FIGS. 1, 3 and 4, or may be used with another embodiment of the present invention.

In particular, FIG. 1 is a functional block diagram for one embodiment of the present invention. FIG. 4 is a functional block diagram that shows the details of the embedding unit illustrated in FIG. 1, while FIG. 3 is a functional block diagram that shows the details for the synchronizer unit illustrated in FIG. 1. The data reducer illustrated in FIG. 1 may be of the type that is disclosed in the Data Reduction application referenced above.

FIG. 2 is a functional block diagram that shows a detector system for an embodiment of the present invention, which detector system may operate independently of the system illustrated in FIG. 1.

Data-Reducer

The data reducer of FIG. 1 may be used to make subsequent operations more efficient, and to separate the signal into different portions for watermarking. Preferably, the data reducer optimally employs a processor that is highly efficient. For audio applications, an example of useful data reduction is downsampling. This corrects for inconsistencies in input sample rate, and can provide significant processor savings on time and frequency domain procedures. Preferably, the downsampling algorithm is chosen for repeatable performance after signal degradation. For this reason, it is preferable to use a windowed sync interpolator in the data reducer. Different target sample rates can be chosen to afford multiple channels of watermarks using the same embedder. The sample rate can also be varied as a function of a key to provide security.

It should be noted that a downsampling data reducer only assures a processor savings during detection. There may actually be an increase in overhead during embedding.

Synchronizer

Different synchronizers may be used for different applications. The simplest synchronizer calculates the offset in sample from the beginning of the track, and creates a sync signal based on a pattern of the offset. This is extremely efficient, but may only be suitable when the decode target can be restored to its original time base and length. Variations on this system may use a signal feature (instead of the beginning of the track) to start the sync pattern-especially with images.

Stream-based decoding and decoding with no reference to the original may require a synchronizer that is based solely on signal characteristics. For this purpose, a module as described in FIG. 3 may be used. The band pass filter may be, for example, a 3 pole Bessel with a center frequency of 0.037*the sample rate, with a bandwidth of 0.0075*the sample rate. Other filters may be used with different characteristics. In general, wider filters may have better performance synchronizing on time-base-altered signals, while narrower filters may have better performance on signals with modified frequency spectra.

Embedder

The embedder may use a frequency domain transformation to weight the strengths of different frequency bands (see, for example, FIG. 4). The psychoacoutic/psychovisual model matches the candidate window with rejection criteria and can make a decision to embed or not, and may possibly make decisions about embedding relative to a predetermined perceptibility threshold. For instance, a decision to embed less than all candidates or embed in some logical pattern that can be later determined for detection or decoding operations. The magnitude sequencer may pick some even numbers of magnitudes of frequency components and modify them to match the current bit. Imagine a sequence of 6 magnitudes:

10.9 12.5 6.3 8.4 20.6 20.1

Calculating ratios between adjacent values yields the following ratios:

0.87 1.98 0.75 0.41 1.02

A bit may be determined by reading the number of ratios less than (or more than) 1.0. In this case, the count is 3 for the number of ratios less than 1 (namely, 0.87, 0.75, and 0.41), so the bit is determined by X mod 2, which, in this case, equals 1. The strength may be defined as the size of the ratio closest to 1 (namely, 1.02) minus 1 (in this case 0.02, or 1.02-1=0.02). This is the amount of change necessary to change the bit encoding. The embedder may have a minimum strength that it allows for a particular signal (e.g., 0.2).

This example can be modified to code either a 1 or a 0. To encode a 1, all strengths below the minimum strength are increased until they reach the minimum:

10.0 12.5 6.3 8.4 22.0 18.3 yielding the following ratios:

0.80 1.98 0.75 0.38 1.20 while maintaining the count of 3.

To encode this example as a 0, it is necessary to flip one of the ratios. Once again, the last 2 can be used:

10.0 12.5 6.3 8.4 18.0 22.5 yielding the following ratios:

0.80 1.98 0.75 0.46 0.80 which now gives a count of 4 and an encoding of 0.

The more frequency bands used, the more likely it is to have a minor modification available to create the correct encoding. However, the more frequency bands used, the more likely that an inadvertent or intentional frequency-modifying event (such as filtering) will affect the coding.

Decoder

The decoder may be described as repeating all of the stages of the embedder, except that instead of modifying the bands, it simply reads the current coding. To protect against false positives, it may be useful to reject windows whose minimum coding strength is below a threshold (e.g., 0.08). Detection may be separate from decoding or "reading the message pattern."

DETAILED DESCRIPTION OF THE INVENTION

Authentication of a digital signal may be handled by protocols that are intentionally perceptible but independently handled by checks of data that have been objectively presented for additional verification. Examples include digital signatures checks (e.g., where the ASCII text represents interpretable data for authentication in a verification step), data glyph checks (e.g., where some "randomly" but identifiable and perceptible data, including unique barcodes, can be authenticated), and perceptible unique identifiers (for instance, holographic stickers or materials not easily replicated). Differentiated from digital watermarks, these forms of authentication exist separately from the data to be protected. Such authentication does not necessarily impact the quality of the underlying information, as would an imperceptible digital watermark. The choice of imperceptibly or perceptibly tagging objects has a direct relationship with processing overhead. The computational difficulty of attacks on watermarks (as compared to attacks on digital signatures) relates to the watermark's imperceptibility as well as the difficulty in forging the watermarking key that was used to create the watermark. By enabling existing scanners, bar code readers, and other perceptible verification devices to additionally verify imperceptible data, security for any number of applications can be improved.

Devices that capture only the perceptibly represented data are not fool proof. Such perceptibly represented data may be forged. Enabling a logical relationship between an imperceptible channel of information and any perceptible identifiers enhances the difficulty in determining what elements of the subliminally embedded data and what features of the perceptible or supraliminally associated information are related. The perceptible information may simply increase the cover size of the data to be protected, meaning the candidate watermark bits can be more efficiently handled if both signal and perceptible identifier are both used to increase the amount of candidate watermark bit space. The inverse is true; for instance, if a Hamiltonian path between bits that are imperceptible and bits that are perceptible describes the path by which the data is to be verified. A digital signature similarly represents entropy which can be changed by the private key holder but is not obvious to the receiver of the information, the digital signature itself is "affixed" to the data but its value is not part of the document.

The ability to enable security of objects that may have value in physical media and electronic media also has clear economic benefits. In situations where economic benefits can be observed by the imperceptible nature of subliminal information, a number of situations exist where the perceptible information has a separate benefit. An example is where data is available for electronic and physical media distribution, and a perceptible mark and an imperceptible mark can be mutually dependent to offer security to both situations. At the same time, an additional affixed security measure, which is not "part" of the signal but is added on top, cannot help the object if it is encoded to some other media, for which the subliminally embedded information is still carried. If a document is digitally signed, no marking is evident. If it is watermarked, the signature is interwoven in the data in an imperceptible manner. If the methods disclosed herein are deployed, noise can be evident in the document but may represent only part of the authentication since imperceptible signature-like changes have also been made. The noise introduced, if removed, does not remove the imperceptible marks, but can be easily observed to indicate that the document has been "tagged". The ease of removing the perceptible tag, when a predetermined glyph or "mark", instead of noise, is obvious. The fact that the perceptible tag is not linear to the imperceptible mark, enables further difficulty in defeating the protocol, whereas the imperceptible information gains some more data space, theoretically, because the perceptible mark has no imperceptibility limits. To further boost the security of any given object combining an imperceptible watermark and perceptible signature-like functions has novel features absent in the prior art.

Digital watermarking algorithms may be optimized to generate a watermark or watermarks that are embedded in a given sample stream. Optimal watermarking can be done depending on the signal stream, images, audio, video and may be optimized for robustness, like an ROW ("robust open watermark"), or security, a forensic or fragile watermark. (See generally, U.S. patent application Ser. No. 09/594,719, entitled "Utilizing Data Reduction in Steganographic and Cryptographic Systems" (hereinafter, "Data Reduction"), as filed Jun. 16, 2000, which application is incorporated by reference herein, in its entirety.) The limitation of absolute imperceptibility is removed once a supraliminal channel is utilized. This limitation acts as a roadblock to further increasing the robustness; if perceptibility for part but not all of the security is dependent on perceptible supraliminal information, better verification of the subliminal channel can be handled with the additional data payload afforded above a "predetermined perceptibility threshold." Utilization of watermark synchronization information or some other detection assistance (for example, statistical or stochastic assumptions about where a watermark is likely to be) may be used to increase the speed and performance of authentication. (See, e.g., the Drawings). Where authorization is dependent on the successful detection or decoding ("reading" or interpreting the actual watermark message) of any given embedded watermark, however, efficiency in detecting or decoding becomes a priority.

Design considerations may be altered in order to change the degree of robustness (the survivability of the watermark measured against signal degradation), security (the difficulty in removal or successful obscuring of the watermark), and perceptibility (the limitation of observable cover signal degradation). Visible uniqueness may also be achieved by altering design considerations. For instance, a perceptibly unique tagging mechanism is typically based on observable features of both intended recipients and third party observers, given consideration for ease-of-recognition. Uniquely identifying tags can be used in such a manner as to enable quick authentication checks that are nonobvious to casual observers (for instance, bar code-like or glyph-like information used for postage. An observer cannot read a glyph datum, but a computer or specialized detector can. At the same time, the existence of the datum indicates some functionality generally unknown or unreadable to casual observers, except that it affirms payment, such as with postage, or enables a device to evaluate the visible data.). Ideally, the unique tag should be difficult to reproduce (e.g., magnetic strips, difficult-to-copy color schemes, physically unique material in currency, or a holographic image). Last, physical identifiers must be sufficiently cost-effective to represent a fair cost and computational expense for the value of the item to be protected. There are both methods for changing some characteristic of a perceptible feature in a signal (luminescence or chromatics), or substituting data for separate identifiable data (an actual logo or tag). Changing a perceptible feature allows for a closer link between the identifying mark and the characteristics of the signal, and when ciphered can be made to act as a tamper-proofing element of the signal. In either case, imperceptibility is not a consideration. Moreover, application of transfer function-based changes to subsets of the signal data enable randomly generated weighting of how the data is outputted. A cryptographically generated key may be associated with the data weighting, to enable noise like distortions to be introduced into the signal. (See generally U.S. patent application Ser. No. 09/046,627, entitled "Method for Combining Transfer Function with Predetermined Key Creation", filed Mar. 24, 1998, which application is incorporated by reference herein, in its entirety).

Combining Subliminal Channels with Supraliminal Channels

The present invention, as a radical departure from the art, seeks to combine the benefits of steganographic ciphering with observable cryptographic protocols. Steganographic ciphering is limited by the channel signal's capacity for imperceptibly embedding data. Identifiable uniqueness lacks such a limitation. Given the breadth of perceptible identifier authentication devices, the security features of digital watermarks can be added to increase the overall security of given objects. The overall ease of implementation is often overlooked in the design of security architectures. The design of a security architecture must take into account the security applied, the value of the objects being protected, the cost associated with the security's renewability, and the difficulty of defeating the security. Measured in computational terms, security must be flexible enough to address new problems. Whereas cryptography represents mathematically provable measures of difficulty in discovering the secret key or keys, steganography serves to bridge cryptography with perceptibility of the watermarked signal. Asymmetric watermarking algorithms are available in systems where the embedding and detection of watermarks utilizes nonlinear relationships between how the signal was sampled and encoded. Certain signal processing schemes, including linear time invariant approaches, can provide adequate nonlinearity to enable public key watermarking schemes. Public key watermarking enables detection of the watermark but not access or detection of the watermark bits to preserve the integrity of the watermark. Hiding a watermark bit or bits in whitened noise or nondeterministic locations in a signal is discussed in U.S. patent application Ser. No. 09/456,319, entitled "Z-Transform Implementation of Digital Watermarks," filed Dec. 8, 1999, which application is incorporated by reference herein, in its entirety.

Embodiments

A number of specific problems exist in the art where combining imperceptible embedding techniques with perceptible security protocols to enhance the security of any given object, including objects represented in physical media. Overall security can be increased in systems where both confusion and diffusion can be optimized. Confusion applies to the ability to hide relationships between the plaintext, ciphertext, and the key. Diffusion enables relationships between the plain text and key to be spread over the ciphertext. Because mathematical proofs rely heavily on credibility, the present invention seeks to leverage the benefits of steganographic ciphering in enabling successful subliminal channels with the notion of a supraliminal channel for handling limitations placed on the subliminal channel (by perceptibility, robustness, and security). The real limitation on the supraliminal channel is to enhance, not to obscure, the security of the data object. Similarly, in straight application of cryptographic protocols, cipher design is intended to make confusion and diffusion iteratively useful in reducing processing overhead. That is, to confuse the pirate by making encryptions look like entropy, or diffuse the encryption making the entire message more difficult to decrypt, or do both in an iterative fashion. If the application is primarily a visible mark type the visible mark is helped by the difficulty of discovering the imperceptible data or the way in which the bits are iteratively integrated into both perceptible and imperceptible domains-and cryptographically stored on a predetermined key. Alternatively, the opposite can be true to reduce the lack of imperceptible candidate bits alone in making a given signal unique.

The present invention likewise borrows the confusion of obfuscated data, from steganography, with the higher demands of cryptographic processing which are limited for application in a digital sample stream if intended only for a subliminal channel (the limit is the channel capacity in part based on a predetermined perceptibility threshold). The present invention also enhances security for objects that can be digitally and physically represented. Because we can observe entropy which is both perceptible and imperceptible, confusing the authentication data with entropy, or noise-like features, utilizing both subliminal and supraliminal channels, results in higher robustness results.

To properly combine the subliminal and supraliminal channel data, it may be desired to predetermine just how much overall data should be introduced or manipulated by the key. Similarly, a single digital signature or one way hash calculation may be propagated across the changes introduced by creating blocks of data, comprising subsets of the overall changes intended. Hashing a current block dependent on the hash of a subsequent block, enables such propagation. The hashing may be directed at those bits in the sample stream which are deemed to have higher perceptible significance or at a point where some data reduction has already been applied to the sample stream (see the Data Reduction application referenced above). The purpose is to enable subsequent detection of tampering of a particular portion of a signal; when applied after data reduction more valuable data, based on the reduction applied, will be hashed. Alternatively, hashes of each subset of data changes may be performed and saved to a detection or encoding key. That is, changes introduced by the encoder contemplated herein may be the basis for the uniqueness that is subsequently checked to enable verification. Separation between just what data subsets are hashed or signed for authentication, and what data needs to be further checked for verification offers a wide range of options to the encoder in enabling robust security features. Any dependencies between how perceptible and imperceptible data is handled can be effectively obscured to increase the complexity of brute force attacks. Further, because information complexity provides a limit of what information is represented in binary or digital terms, hashing data reduced portions of a signal or propagating such a hash throughout a signal is likely to secure the perceptibly significant portions of any given signal.

Unique Document Creation

Prior to distribution of a document, an imperceptible watermark consisting of at least one bit is uniquely generated for a plurality of copies. The embedding key may be maintained by the sender for security. Each of a plurality of intended recipients sends a public key, uniquely identifying each recipient, to further perceptibly mark the document based on the provided public keys. Alternatively, the public keys can be used to digitally sign the document. Ultimately, any number of relationships between the perceptible and imperceptible marks can be made to uniquely identify the documents. The digital signature, representing an affixed unique identifier based on any encryption performed on the plaintext is viewed as additional security. Should the document need to be authenticated or verified, a hierarchy representing the imperceptible and perceptible data can be ciphered so as to confuse potential attempts at tampering with the document. For predetermined documents (in the sense that any physical features are controlled by the sender), such as currency, postage stamps, travelers' checks, or the like can be estimated for any physical nonuniformities in the physical representation to assist in further representations of uniqueness for the physical documents. Unlike other technologies in the prior art, the present invention offers the benefit of digital watermarking as an imperceptible and perceptible application to address the inherent limits of computation of a subliminal channel alone. Additionally, the enhanced mapping based on the evaluation of a predetermined perceptibility threshold (for determinations of the difference between the subliminal and supraliminal channel) provides for higher robustness and resistance to brute force attacks on understanding the structure of the materials or logically ordered and mapped information being added to an object.

Improved Steganographic Ciphers

The improvement of the present invention relates to predetermining the available candidate bits for a steganographic ciphering process and then "sealing" the remaining bits. Most steganographic ciphering utilizes less than all available candidate bits to force attempts at removal to randomize a larger set of bits. A randomization attack operates by bit-flipping those bits which are believed to represent the predetermined watermark. Choosing a subset of the candidate bits increases the randomness of the actual bits manipulated. The choice to manipulate any remaining bits in the candidate subliminal channel bit stream serves as a means for sealing the entire digital watermark channel. (a watermark algorithm determines the candidate bits for watermarking and randomly changes a subset of the overall candidate bits, the remaining bits that are not chosen by the encoder can be determined and saved to differentiate the watermark bits from the additional bits that could have been watermarked in the candidate bit set of data). The further improvement of the present invention may utilize any supraliminal channel entropy or noise to enable logical relationships between imperceptible and perceptible noise for any given data object. Confusing authentication or verification bits with noise above and below a perceptibility threshold (the supraliminal and subliminal channels) removes some of the stricter limitations imposed by the imperceptibility requirements of steganographic cipher techniques, as described in the art. Moreover, enabling true subliminal free channels for digital objects requires an understanding of the overall available entropy in a document. Digital signatures hash the entropy in the document and save the hash to the private key so that the private key holder can determine if the document has been altered, usually a byte, 8 bits of data, must be changed for the signature check to fail. However, signature algorithms which are deemed subliminal free suffer from an incomplete information theoretic understanding both of the math which "proves" public key cryptography (there is no real proof only mathematically difficult problems such as factoring or Fermat's Theorem), and how much data relates the public and private key via the message being signed. Zero knowledge proofs address this partially by requiring some additional bit commitment by the sender to establish for the receiver that it was indeed he who signed the message, say by the alteration of a specific bit of a set of candidate entropy bits in the signal. Essentially separating "useful" information from information alone. However, since zero knowledge proofs are not related to measures of perceptibility, an for the purposes of the present invention such measures invariably matter to securing or making unique objects, by use of a steganographic cipher it can be determined, in advance, all candidate bits and enable additional related supraliminal bits to play a role in a predetermined change which suffices a zero knowledge proof.

Screening Technique for Caching or Archival Purposes

A visible watermark has application to screening in much the same way as robust open watermarks (ROW). [For a discussion of ROWs, see pending U.S. patent application Ser. No. 09/594,719, filed Jun. 16, 2000, entitled "Utilizing Data Reduction in Steganographic and Cryptographic Systems" (which is a continuation-in-part of PCT application No. PCT/US00/06522, filed Mar. 14, 2000, which PCT application claimed priority to U.S. Provisional Application No. 60/125,990, filed Mar. 24, 1999), and PCT Application No. PCT/US00/21189, filed Aug. 4, 2000 (which claims priority to U.S. patent application Ser. No. 60/147,134, filed Aug. 4, 1999, and to U.S. patent application Ser. No. 60/213,489, filed Jun. 23, 2000, both of which are entitled, "A Secure Personal Content Server"). The previously identified patents and/or patent applications are hereby incorporated by reference, in their entireties.]

While a visible watermark has traditionally been viewed as an ordered pattern which renders differences observable to 3rd parties for any particular media object, an ROW ("robust open watermark") is a fixed low cost imperceptible watermark designed to be robust against a number of signal manipulations (which can be predetermined as well). To boost the security of a visible watermark, ciphering of the mapped and observable changes made to a signal are made. Similarly, any imperceptible marks can be ciphered as well. By enabling a system to handle either perceptible marks (which need not be discovered by casual observers) or ROWs (which are informationally hidden in a manner consistent with the perceptibly significant features of a given data object), or both, screening can be made more robust. First, many data objects benefit from perceptible marks, including those objects that require quick visible authentication, such as traveler's checks and currency. The perceptible mark can be quickly checked since it is readily perceptible. Second, the perceptible marks may be made more random by application of a transfer function to scramble the signal changes enabling only the holder of a predetermined key the ability to observe the perceptible mark in an unfettered manner. Third, combinations of perceptible marks and ROWs are a low cost means for screening data objects which are sent and received by servers or caching applications for which data object-based tagging is desired (for legal reasons, efficiencies in grouping commercial and noncommercial objects consistently, etc.). The visible watermark, or manipulated supraliminal channel, may simply contain redundant enough information to be logically associated with the predetermined key (having both subliminal and supraliminal mapping and ciphering information), the predetermined message (which may exist in either the subliminal, or supraliminal channels, or both channels, and may be encrypted), and the object being protected (which may first be subject to some form of data reduction to measure the absolute minimum amount of data required to appropriately represent the object informationally or physically).

The present invention would increase the breadth of authentication and verification techniques that have a wider range of computational requirements to enable a wider range of commercial activity. With the addition of perceptible tags, the range increases beyond applications which focus strictly on imperceptible tagging (as most digital watermarking systems do). Consumers would have a simpler means for self-authentication of an object by observing a visible watermark and by supplying their public key to a server for which the watermarked object exists. The public key and signal characteristics of that data object sought could be further combined to assist in imperceptibly tagging the object with a forensic watermark (i.e., the characteristics of the object, the characteristics of the perceptible mark and the public key in combination can be used to generate an imperceptible mark). Alternatively, separation of the authentication of the visible or perceptible mark from the data object alone can be logically constrained for successful authentication or verification of the imperceptible tag to assure that data objects are handled in a manner consistent with the designs of the owner or creator of the data signal being offered. Providers of storage and archive space, and services which handle data which may be copyrighted or require security, benefit from the relationship between the perceptible and imperceptible tagging mechanism with the signal characteristics of the object. Unlike many disclosed systems in the prior art, too many systems rely strictly on access restriction protocols or security which has no relationship with the signal features of the data being protected.

While the invention has been particularly shown and described by the foregoing detailed description, it will be understood by those skilled in the art that various other changes in form and detail may be made without departing from the spirit and scope of the invention.

What is claimed is:

1. A method for protecting a data signal comprising:
   providing an original data signal to be encoded;
   predetermining a perceptibility threshold for said encoding;
   predeterminig at least one dependency between a first set of independent data and a second set of independent data;
   using a first cryptographic key to encode the first set of independent data into the data signal imperceptibly below the perceptibility threshold; and
   using a second cryptographic key to encode the second set of independent data into the data signal perceptibly above the perceptibility threshold.

2. The method of claim 1, wherein the imperceptibly encoded data comprises a digital watermark associated with at least one cryptographic key.

3. The method of claim 1, wherein the step of using the first cryptographic key to encode data into the data signal imperceptibly comprises using the first cryptograhic key to encode the first set of independent data into the data signal imperceptibly below the perceptibility threshold in a predetermined location in at least one of the following domains: frequency; time; spatial; and bit depth.

4. The method of claim 1, wherein the step of using the first cryptographic key to imperceptibly encode data into the data signal comprises using a transfer function to imperceptibly encode the first set of independent data below the perceptibility threshold into the data signal.

5. The method of claim 1, wherein the step of using the first cryptographic key to imperceptibly encode data into the data signal comprises using a symmetric cipher to imperceptibly encode the first set of independent data below the perceptibility threshold into the data signal.

6. The method of claim 1, wherein the perceptibly encoded data above the perceptibility threshold and the imperceptibly encoded data below the perceptibility threshold are encoded such that there is a logical relationship between the perceptibly encoded data and the imperceptibly encoded data.

7. The method of claim 1, wherein the perceptibly encoded data above the perceptibility threshold and the imperceptibly encoded data below the perceptibility threshold are encoded such that there is a hierarchical relationship between the perceptibly encoded data and the imperceptibly encoded data.

8. The method of claim 1, further comprising:
   hashing the first set of independent data and associating the hash value of the first set of independent data with the first cryptographic key; and
   hashing the second set of independent data and associating the hash value of the second set of independent data with the second cryptographic key.

9. The method of claim 1, further comprising:
   hashing the first set of independent data and associating the hash value of the first set of independent data with the second cryptographic key; and
   hashing the second set of independent data and associating the hash value of the second set of independent data with the first cryptograghic key.

10. The method of claim 1, wherein the step of using the second cryptographic key to perceptibly encode data above the perceptibility threshold into the data signal comprises:
    hashing the second set of independent data;
    associating the hash value of the second set of independent data with the second set of independent data; and
    using the second cryptographic key to encode the hash value of the second set of independent data perceptibly above the perceptibility threshold into the data signal.

11. The method of claim 1, wherein the first set of independent data is identical to the second set of independent data.

12. The method of claim 1, further comprising:
    determining at least one difference between the original data signal and the encoded data signal;
    hashing the at least one difference between the original data signal and the encoded data signal; and
    associating the hash value of the at least one difference between the original data signal and the encoded data signal to at least one of the first cryptographic key and the second cryptographic key.

13. The method of claim 1, further comprising:
    removing the data that has been perceptibly encoded above the perceptibility threshold into the data signal.

14. The method of claim 1, wherein the step of using the second cryptographic key to perceptibly encode data above the perceptibility threshold into the data signal comprises using the second cryptographic key to encode the first set of independent data into the data signal such that the data signal is degraded perceptibly to a predetermined amount of degradation.

15. The method of claim 1, wherein the second set of independent data includes information about the first cryptographic key to permit the removal of the data that was imperceptibly encoded below the perceptibility threshold into the data signal.

* * * * *

UNITED STATES PATENT AND TRADEMARK OFFICE
CERTIFICATE OF CORRECTION

PATENT NO. : 7,127,615 B2
APPLICATION NO. : 09/956262
DATED : October 24, 2006
INVENTOR(S) : Scott Moskowitz It is certified that error appears in the above-identified patent and that said Letters Patent is hereby corrected as shown below:

| Column | Line |  |
|---|---|---|
| 9  | 33 | Change "channel." to --channel-- |
| 11 | 36 | Change "predeterminig" to --predetermining-- |
| 11 | 50 | Change "cryptograhic" to --cryptographic-- |
| 12 | 26 | Change "cryptograghic" to --cryptographic-- |

Signed and Sealed this

Fifth Day of June, 2007

JON W. DUDAS
*Director of the United States Patent and Trademark Office*